Figure 3:
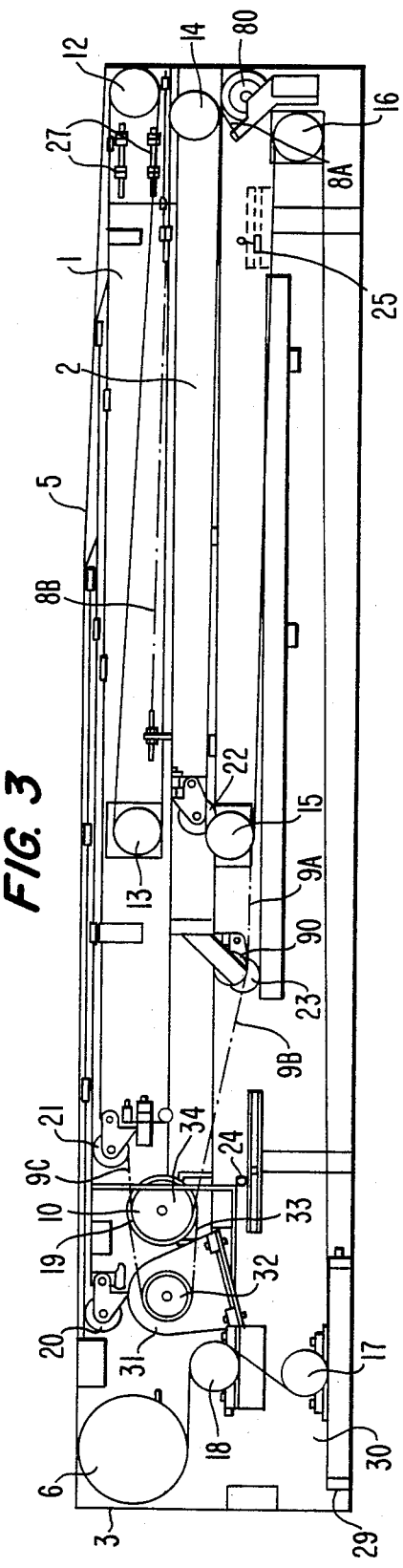

United States Patent [19]
Calundan

[11] Patent Number: 4,643,299
[45] Date of Patent: Feb. 17, 1987

[54] TELESCOPIC BELT CONVEYOR

[75] Inventor: Kaj B. Calundan, Skanderborg, Denmark

[73] Assignee: Caljan A/S, Hasselager, Denmark

[21] Appl. No.: 618,258

[22] Filed: Jun. 7, 1984

[51] Int. Cl.⁴ ............................................. B65G 21/14
[52] U.S. Cl. ..................................................... 198/812
[58] Field of Search .............................. 198/812, 594; 193/35 TE; 414/743; 212/267

[56] References Cited

U.S. PATENT DOCUMENTS

| 2,815,849 | 12/1957 | Zumbrunnen | 193/35 TE |
| 4,392,573 | 7/1983 | Gyomrey | 212/267 |
| 4,406,375 | 9/1983 | Hockensmith | 212/267 |

FOREIGN PATENT DOCUMENTS

| 761416 | 9/1980 | U.S.S.R. | 212/267 |
| 956418 | 9/1982 | U.S.S.R. | 212/267 |

Primary Examiner—Joseph E. Valenza
Assistant Examiner—Kyle E. Shane
Attorney, Agent, or Firm—Antonelli, Terry & Wands

[57] ABSTRACT

A Telescopic conveyor comprises a fixed housing which is open at one end through which a number, as for instance two, three or more, lengthy and belt carrying units arranged above each other are extendably and retractably and slidably mounted within the housing to be slit out from the housing, whereby the lower slidable units at the outer end comprise supporting means for carrying the slidable units positioned above and whereby each of the slidable units comprise at least two belt rollers or drums of which one is positioned foremost at each of the units and whereby furthermore a telescopic drive unit is contained within the conveyor comprising one or more drive belts or drive chains with the ends of each drive belt or drive chain being connected in one end to the fixed and in the other end to the uppermost slidable unit so that at least one of the drive belts or the drive chains are driven by a drive roller or drum respectively by a sprocket. The housing may be of the hoistable kind being carried by a hoisting device or may be f.i. of the hinged kind, being hinged unto a supporting stand or unto a rollable cart. Comprising one common conveyor belt, this belt and the telescopic drive may be controlled from a front end control box.

5 Claims, 5 Drawing Figures

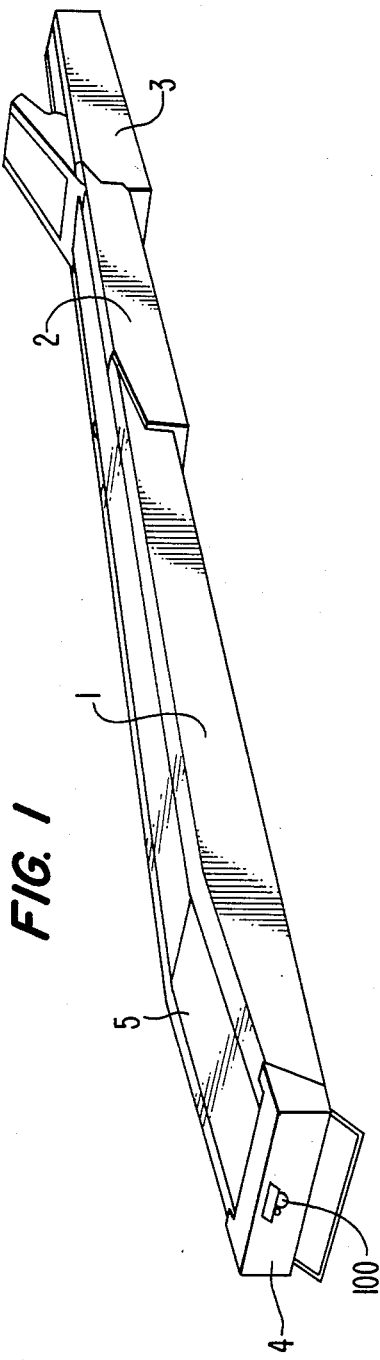
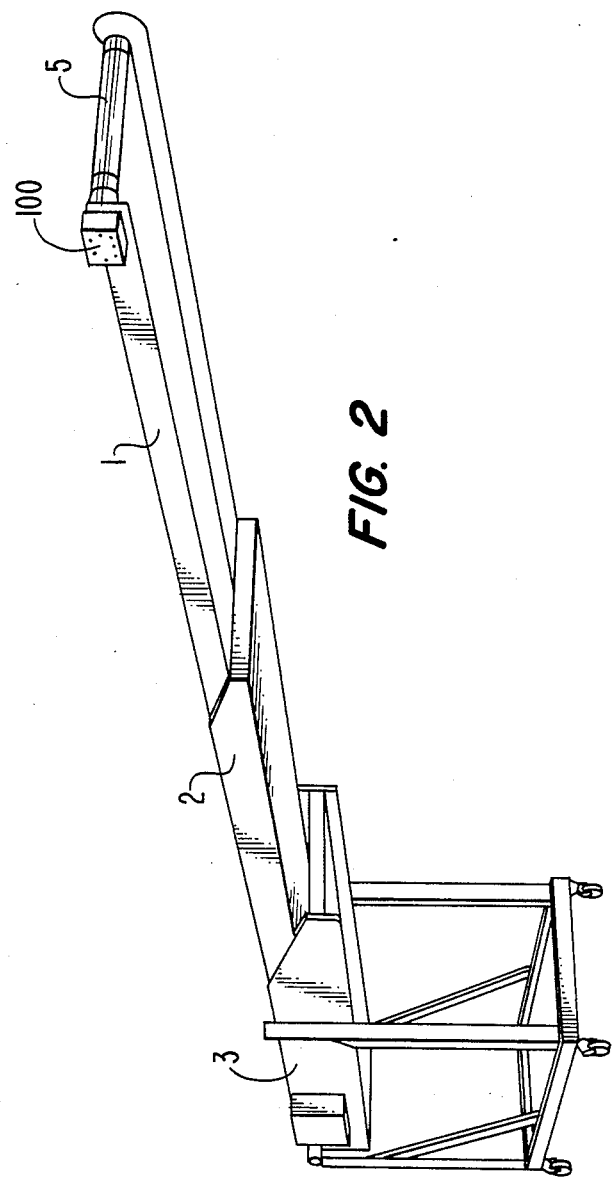

TELESCOPIC BELT CONVEYOR

The present invention relates to a telescopic belt conveyor comprising a number of above each other arranged and into and out from a supporting housing extendable and retractable and slidably mounted belt conveyor portions.

Such a type of belt conveyor can have a housing which is fixed positioned and the outmost conveyor end can be slided out from the house into the cargo compartment of a vehicle to enable an easy loading and unloading of parcels or other objects of confined dimensions into or from such a cargo compartment. The housing can also be mounted on a cart hinged at the rear end unto a supporting stand upon the cart and supported upon the cart by a pneumatic or hydraulic cylinder means at the front end of the housing thus enabling the telescopic belt conveyor to establish an oblique loading respectively unloading pathway unto or from a higher or lower positioned cargo compartment of a cargo vehicle, etc.

The primary purpose of the present invention is to devise a telescopic belt conveyor which being of very sturdy nature also is comparatively cheap to manufacture and within which the number of movable parts is kept very low.

Another purpose is to devise a telescopic belt conveyor which besides possessing the above mentioned advantages also in a cheap manner effectively can be controlled from the front end of the belt conveyor thus enabling a manipulation of the belt conveyor by a person being situated deep within a large cargo compartment, e.g. of a vehicle, or deep within a store room, etc.

Furthermore it is the object according to the present invention to devise a telescopic belt conveyor in which the main connecting and mounting parts with a minimum of rearrangement can be utilised for telescopic conveyors comprising different numbers of slidable belt conveyor portions.

These purposes are attained by means of a telescopic conveyor in which according to the present invention the belt conveyor portions comprise one common conveyor belt or along a common pathway run conveyor belts being within each belt portion led over two conveyor belt guiding rolls, of which one is positioned at the front end and the other in spaced relationship at least with the extension length behind the first of the two rolls within each conveyor belt portion and where according to the present invention a common drive unit for the performing of the extending and retracting telescopic movements is positioned behind the conveyor belt rolls of the telescopic movable portions of the telescopic belt conveyor.

A preferred structure of the drive unit within such a telescopic conveyor fullfils the purpose of simplicity and possibility of application in connection with more such slidable mounted belt conveyor portions when according to the present invention the drive unit comprises two or more lengths of belt or chain portions of which at least one length has one end connected to the inner end of the outmost belt conveyor portion and the other end connected to the outer end of the inmost of the belt conveyor portions and which length is driven by a belt or chain drive unit positioned at the rear portion of one of the intermediate extendable and retractable belt conveyor portions and which length is led over guide direction changing means respectively positioned at the opposite ends of the belt conveyor units if more such are present below and above the drive unit carrying belt conveyor portion to achieve said fastening of the drive belt or chain for the telescopic movements and in that at least one further length of belt or chain undriven at its two ends is connected as the just mentioned drive belt or chain length unto the same or in the vicinity of the connecting positions herefore and being led over guide direction changing means positioned at, compared hereto, opposite ends with regard to the corresponding means for the aforesaid drive belt or chain length.

Figure 4:
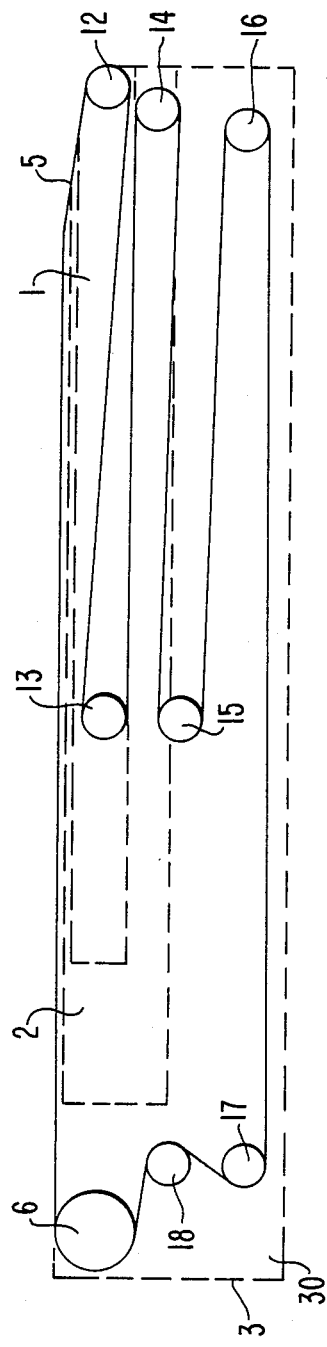
Figure 5:
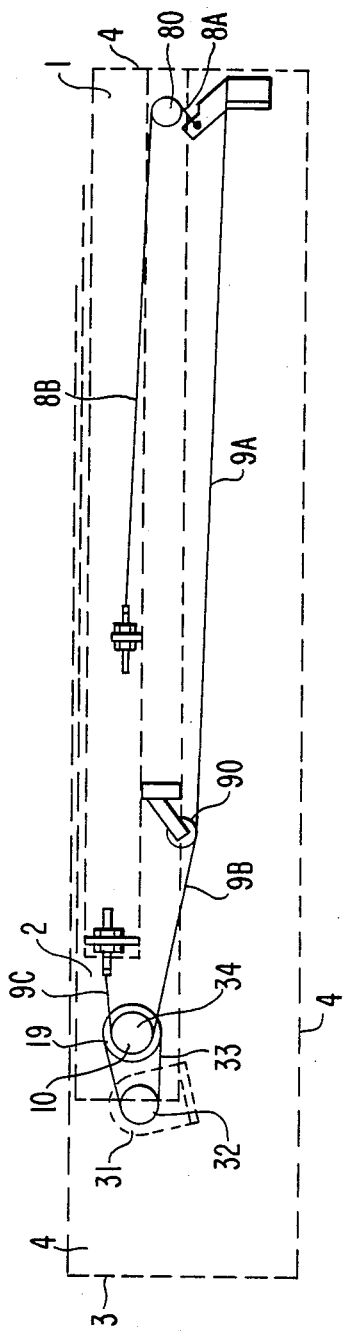

Further advantages and purposes according to the present invention become evident of the following more detailed description of a preferred embodiment according to the invention under reference to the drawing in which:

FIG. 1 illustrates in perspective a telescopic belt conveyor having two extendable and one fixed belt conveyor portions embodying the present invention, FIG. 2 shows the same as FIG. 1, but in a modified embodiment, FIG. 3 illustrates a vertical lengthwise cut through the embodiments according to FIG. 1 or FIG. 2 showing the essential internal elements within the conveyor, FIG. 4 illustrates the same as FIG. 3, but shows only the arrangement of the common belt for the three belt conveyor portions, and FIG. 5 illustrates the same as FIG. 3, but shows only the arrangement of the drive unit for driving the telescopic movements within the conveyor.

FIG. 1 and FIG. 2 of the drawing illustrate in the perspective two modifications of embodiments of a telescopic belt conveyor according to the present invention, namely comprising an outmost belt conveyor portion 1 carried by an intermediate belt conveyor portion 2 which again is carried by a belt conveyor portion housed within a fixed housing 3. The housing can thus be fixed, but can as earlier mentioned also be arranged on a supporting cart, etc. The front end 4 of the telescopic belt conveyor carries a box 100 which can house switches for the operations of the belt and of the telescopic movements of the telescope. The switches can thus be placed in series or in parallel or be switched, by a switch panel positioned anywhere else, out or in in proportion to the control circuit for drive motors of conventional type used to drive the belt or the drive unit for driving the telescopic movements and which drive means are described in more detail as follows. The box 100 of FIG. 1 or FIG. 2 can via a cable housed upon a cable reel positioned in the conveyor housing 3 stay in connection with the mentioned control circuits. The cable can be as well an electric cable or a pneumatic or hydraulic connection cable or other well known cable types to be used for the purpose.

The conveyor carries an endless belt 5 which can be driven by any roller carrying the belt. In case of the embodiment shown in lengthwise cross section in FIG. 3 and 5 the belt is driven by roll 6, within which a drive motor of well known type is positioned. The main feature of the conveyor is that one common belt is used for all the telescopic belt conveyor portions 1, 2 and 3. Further such belt conveyor portions can be added as earlier mentioned as two additional rolls are added each time for the carrying of the common belt 5, namely two additional rolls per belt conveyor portion. Only two rolls are thus required, but in case of especially heavy cargo to be handled by the conveyor evidently further belt supporting rolls may be added, but for general use the remarkable is that no more rolls than indicated have to be used.

The drive unit for the performing of the telescopic movements is illustrated in FIG. 3 and FIG. 5. The advantage according to the invention is that the drive unit motor for these movements also is common for all the employed belt conveyor portions, the drive motor is designated 31. It may be an electric motor just as well as the drive motor for the belt may be it. But use of other motor types, such as pneumatic or hydraulic motor types, is without further modification generally possible. The motor 31 drives through a transmission, e.g. via a chain 33 and sprockets 32 and 34 a drive wheel or sprocket 10 a drive belt or drive chain 9 having in case of the shown embodiment three sub lengths 9A, 9B and 9C together forming the complete necessary drive length which in the following without further reference is designated 9. An other undriven length of belt or chain in complete also without further reference designated 8 comprises according to FIG. 3 and FIG. 5 of the drawing two sub lengths 8A and 8B. The one end of the lengths 8 and 9 in general are connected to the housing portion 3 of the belt conveyor as shown at the front end of the housing 3, whereas the other end of the lengths 8 and 9 not too far from each other are connected unto the outmost extendable belt conveyor portion 1. When the motor 31 rotates the one or the other way round the intermediate belt conveyor portion 2 shown carrying the drive motor 31 slides itself out or in in proportion to the housing 3, and whenever the friction sliding friction not is too high between the belt conveyor portions 1 and 2 the belt conveyor portion 1 is extended or retracted in proportion to the belt conveyor portion 2 simultaneously. A sprocket 90 or other suitable guiding means situated upon the intermediate belt conveyor portion 2 may be comprised. It serves the purpose of maintaining the operational guide-directions of the two sub lengths 9A and 9C in proportion to the telescopic movements whereby the drive belts or chains 8 and 9 are kept reasonably tight during the telescopic movements and therefore also during periods of use and rest of the conveyor.

According to FIG. 3 and FIG. 4 the common transportation belt 5 is run over rolls 6, which is the drive roll, and rolls 12, 13, 14, 15, 16, 17 and 18. The rolls 12 and 13 are situated upon the belt conveyor portion 1, the rolls 14 and 15 upon the drive motor carrying belt conveyor portion 2 and the rolls 16, 17 and 18 including roll 6 are situated within the housing portion 3. Theoretically the rolls 17 and 18 could be omitted, but they serve the purpose as tension keeping means for keeping the belt 5 in a suitable stretched condition, thus 29 designates a screw means to adjust the position of roll 17.

The mechanical spacing between the two rolls of each belt conveyor portion, i.e. between rolls 13 and 14 and between rolls 14 and 15 of the movable portions, should be so that the spacing is larger than the maximum extension travel of each of the single belt conveyor portions. With a roller arrangement as shown the belt 5 remains suitably stretched irrespective of the actual extension position of the outmost belt conveyor portion 1.

The drive motor 31 may be supplied by a cable connection wound upon a cable reel, and by means of the shown structure according to the present invention the two mentioned cable reels may be positioned on the same reel axis positioned in the housing 3 at the rear of the drive motor 31 and in front of the drive roller 6.

The single extendable belt conveyor portions 1 and 2 may slide in simple guide rails. The mounting and friction may be achieved for better performance by inserting supportrollers 20, 21, 22 and 23 and possibly also by rollers on the axis common with the guide means 80.

To enable a possibility of adjusting the tension of the belt 5 from both ends of the conveyor tensioning screws 27 acting in connection with roller 12 might be mounted.

To safeguard that the drive motor 31 does not overstrain the drive belt or drive chains 8 and 9 two end stop switches can be inserted at 24 and 25 for the switching off respectively possible reversal of the drive direction of motor 31. The end stop switches are shown positioned upon fixation rails so that their positions may be adjusted.

The foremost conveyor belt roll may consist of an inner rotary roll having a somewhat oversized diameter and of two shorter fixed positioned rolls with smaller diameter with one such shorter roll positioned at either side of the rotary conveyor belt roll all mounted having a common geometrical axis. Hereby the front end becomes more finger touch proof and therefore more safe to use for the persons during loading and unloading of the conveyor.

I claim:

1. A telescopic belt conveyor comprising a plurality of slidably mounted belt conveyor sections arranged above each other, said sections being extendable and retractable from and into a supporting housing and sharing a guide means for a common conveyor belt which in each section comprises at least two conveyor belt guiding rolls, of which one roll is positioned farther out in the section than the at least one other roll which is positioned at a length at least equal to the section extension length behind the first mentioned roll of the section; a common drive means for driving a driven tackle means, said driven tackle means including at least one tackle guide direction changing means and being drivably connected with an extendable and retractable belt conveyor section which is above an intermediate section of said belt conveyor sections and with the supporting housing driving the extension and retraction of said extendable and retractable belt conveyor sections; a second undriven tackle means having one end connected to the inner end of the outermost of said belt conveyor sections and another end connected to the supporting housing, the common drive means for the driven tackle means being positioned at the rear end portion of said intermediate section of said extendable and retractable belt conveyor sections, and each of said tackle means comprising at least one flexible portion and at least one drive direction changing means whereby at least two belt conveyor sections can be provided and can be extended and retracted by said common drive means, said driven tackle means and said undriven tackle means.

2. The telescopic belt conveyor of claim 1, further comprising activating circuit means associated with the drive means for the telescopic movement of the conveyor, and locally operable means positioned at the outmost end of the outermost extendable and retractable belt conveyor section for activating the circuit means.

3. Telescopic belt conveyor of claim 1, in which the supporting house has a free spaced lower and rear end portion comprising at least one tension roll for the common conveyor belt.

4. Telescopic belt conveyor of claim 2, in which the supporting housing has a free spaced lower and rear end portion comprising at least one tension roll for the common conveyor belt.

5. A telescopic belt conveyor according to claim 1, wherein said driven tackle means is drivably connected with the outermost extendable and retractable conveyor section and with the supporting housing for driving the extension and retraction of said extendable and retractable belt conveyor sections.

* * * * *